United States Patent
Aroyan

(10) Patent No.: US 6,593,916 B1
(45) Date of Patent: Jul. 15, 2003

(54) TOUCHSCREEN HAVING MULTIPLE PARALLEL CONNECTIONS TO EACH ELECTRODE IN A SERIES RESISTOR CHAIN ON THE PERIPHERY OF THE TOUCH AREA

(76) Inventor: James L. Aroyan, 338 Wilkes Cir., Santa Cruz, CA (US) 95060-5936

( * ) Notice: Subject to any disclaimer, the term of this patent is extended or adjusted under 35 U.S.C. 154(b) by 63 days.

(21) Appl. No.: 09/705,383

(22) Filed: Nov. 3, 2000

(51) Int. Cl.⁷ .................................................. G09G 5/00
(52) U.S. Cl. ........................ 345/173; 345/174; 345/176; 345/177; 345/178
(58) Field of Search ............................... 345/156, 173, 345/176, 177, 178, 174, 180; 178/18.01–18.11, 19.01–19.07, 20.01–20.04

(56) References Cited

U.S. PATENT DOCUMENTS

| | | | |
|---|---|---|---|
| 3,591,718 A | 7/1971 | Asano et al. .................. | 178/19 |
| 4,198,539 A | 4/1980 | Pepper, Jr. .................... | 178/18 |
| 4,220,815 A | 9/1980 | Gibson et al. ................. | 178/18 |
| 4,371,746 A | 2/1983 | Pepper, Jr. .................... | 178/18 |
| 4,661,655 A | 4/1987 | Gibson et al. ................. | 178/18 |
| 4,731,508 A | 3/1988 | Gibson et al. ................. | 178/18 |
| 4,797,514 A | 1/1989 | Talmage, Jr. et al. ......... | 178/18 |
| 4,822,957 A | 4/1989 | Talmage, Jr. et al. ......... | 178/18 |
| 5,041,701 A | 8/1991 | Wolfe et al. ................... | 178/18 |
| 5,045,644 A | 9/1991 | Dunthorn ...................... | 178/18 |
| 5,113,041 A * | 5/1992 | Blonder et al. ........... | 178/18.01 |
| 5,220,136 A | 6/1993 | Kent ............................. | 178/18 |
| 5,686,705 A * | 11/1997 | Conroy et al. ............ | 178/18.05 |
| 5,736,688 A * | 4/1998 | Barrett et al. ............. | 178/18.05 |
| 5,804,773 A | 9/1998 | Wilson et al. ................. | 178/19 |
| 5,815,141 A | 9/1998 | Phares .......................... | 345/173 |
| 5,869,791 A | 2/1999 | Young ....................... | 178/20.01 |
| 6,163,313 A * | 12/2000 | Aroyan et al. ............ | 178/18.04 |
| 6,373,475 B1 * | 4/2002 | Challis ..................... | 178/18.01 |

FOREIGN PATENT DOCUMENTS

| | | | | |
|---|---|---|---|---|
| WO | WO 87/04553 | 7/1987 | ........... | G08C/21/00 |
| WO | WO 930272 | 6/1999 | | |
| WO | WO 99/30272 | 6/1999 | ........... | G06K/11/12 |

\* cited by examiner

*Primary Examiner*—Bipin Shalwala
*Assistant Examiner*—Prabodh M. Dharia

(57) ABSTRACT

A resistive or capacitive position touchscreen includes a glass substrate having a uniform resistive coating and series resistive chains of overlapping discrete electrodes adjacent to the peripheral edges of the substrate. Gaps in an otherwise insulating linear discontinuity running parallel to each chain form resistive current paths across the touch area. There are at least two gaps for each electrode so that multiple current paths connect to each electrode. Each gap produces a local ripple in the voltage field which decays away with distance from the gap. Since the ripple decay length is determined by the distance between current paths, the magnitude of the ripple near the electrodes is reduced exponentially by a factor corresponding to the number of gaps per electrode.

8 Claims, 5 Drawing Sheets

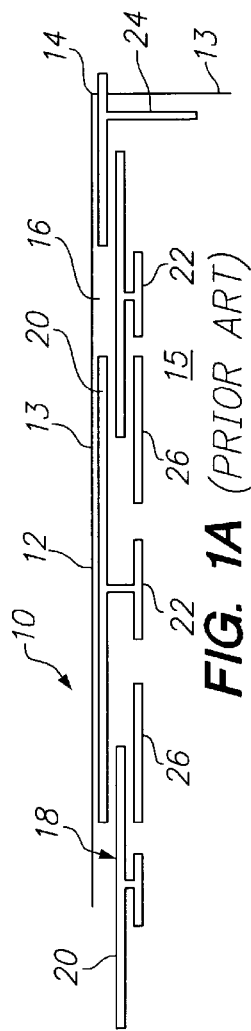
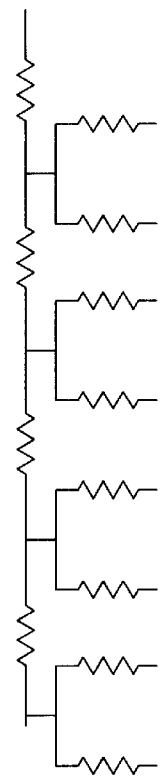
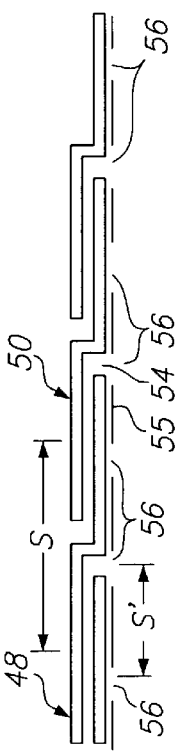
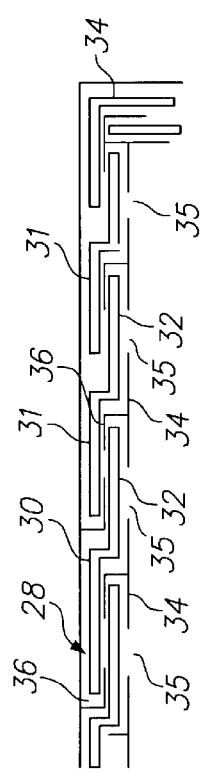
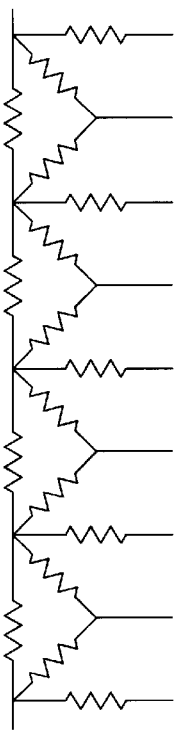
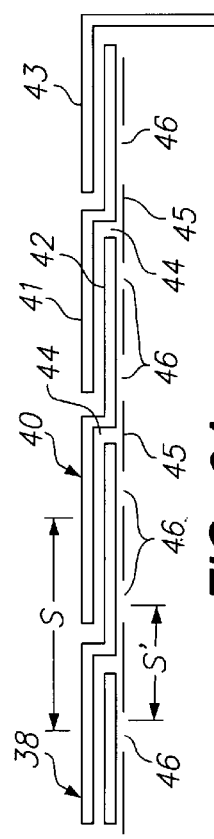

TOUCHSCREEN HAVING MULTIPLE PARALLEL CONNECTIONS TO EACH ELECTRODE IN A SERIES RESISTOR CHAIN ON THE PERIPHERY OF THE TOUCH AREA

BACKGROUND OF THE INVENTION

1. Field of the Invention

The present invention relates to devices for determining the coordinates (i.e., X and Y coordinates) of a location in a two-dimensional system such as touch sensitive screens for producing output signals related to a touched position. The present invention more particularly provides a 5-wire (or 9-wire) resistive touch sensor having improved linearity near the periphery of the touch sensitive area.

2. Description of the Prior Art

A touchscreen is a transparent input device that can sense the two-dimensional position of the touch of a finger or other electronically passive stylus. Touchscreens are placed over display devices such as cathode-ray-tube monitors and liquid crystal displays to provide inputs for restaurant order entry systems, industrial process control applications, interactive museum exhibits, public information kiosks, lap-top computers, etc.

Presently, the dominant touch technologies are 4-wire resistive, 5-wire resistive, capacitive, ultrasonic, and infrared. These are technologies that have delivered high standards of performance at cost-competitive prices. An important aspect of touchscreen performance is a close correspondence between true and measured touch positions at all locations within the touch sensitive area.

5-wire resistive touchscreens, e.g. the AccuTouch™ product line of Elo TouchSystems, Inc. of Fremont, Calif., have been widely accepted for many touchscreen applications. In these touchscreens, mechanical pressure from a finger or stylus causes a plastic membrane coversheet to flex and make physical contact with an underlying glass substrate. The glass substrate is coated with a resistive layer upon which voltage gradients are excited. Via electrical connections to the four corners of the coated glass substrate, associated electronics can sequentially excite gradients in both the X and Y directions, as described in U.S. Pat. No. 3,591,718. The underside of the coversheet has a conductive coating that provides an electrical connection between the touch location and voltage sensing electronics. Since both X and Y voltage gradients are generated on the substrate's resistive coating, the coversheet coating need only provide electrical continuity. Further details regarding 5-wire resistive touchscreens are found U.S. Pat. No. 4,220,815 to Gibson; U.S. Pat. Nos. 4,661,655 and 4,731,508 to Gibson et al.; U.S. Pat. No. 4,822,957 to Talmadge et al.; U.S. Pat. No. 5,045,644 to Dunthorn; and U.S. Pat. No. 5,220,136 to Kent.

Electronics can obtain touch information from a 5-wire resistive touchscreen via current injection as well as the voltage excitation described above. For current injection read out, a current source injects current though the coversheet and the currents arriving at each of the four corner connection points are then measured during a touch. From the sums and ratios of these corner currents, touch positions are reconstructed. The choice between current injection and voltage excitation is an electronics design choice and is largely independent of touchscreen design. Peripheral electrode pattern designs for touch systems with voltage-excitation electronics are equally applicable to touch systems with current-injection electronics.

Capacitive touchscreens often require peripheral electrode patterns that serve the same basic function as in 5-wire resistive touchscreens. MicroTouch Systems, Inc. offers both capacitive touchscreens (ClearTek™) and 5-wire resistive touchscreens (TouchTek™) with peripheral electrode patterns similar to FIG. 1b of U.S. Pat. No. 4,371,746 of Pepper. In a capacitive touchscreen, the coversheet is replaced by a thin transparent dielectric coating that then forms the exterior surface of the ITO or ATO coated substrate. An oscillating voltage is applied to the four corner connection points. A finger touch provides an AC shunt to ground and hence serves as an AC current source (sink) at the location of the touch. The division of this AC current between the four corner connection points is measured and used to determine touch coordinates. An AC variant of current-injection electronics is used.

It is sometimes advantageous to have both a drive and a sense line connection between the electronics and each of the four corner connection points. With appropriate feedback loops in the electronics, the combination of drive and sense lines gives the electronics better control over the excitation voltages applied to the corner connection points. This leads to a variant of "5-wire" touchscreens with 9 wire connections between the electronics and the touchscreen. The design of the peripheral electrode pattern is largely unaffected by the choice between 5-wire and 9-wire connection schemes.

A 5-wire resistive touchscreen typically includes a glass substrate 1 to 3 mm thick on which a transparent resistive coating has been applied. A peripheral electrode pattern is formed on the substrate as a geometric pattern of printed conductive ink on the resistive coating, and insulating regions formed in the resistive coating. ITO (indium tin oxide) and ATO (antimony tin oxide) are examples of degenerate semi-conductors which have the important property of being both conductive and transparent, and may serve as resistive coatings. The regions between the conductive electrodes form resistors, with the insulating regions defining conductive paths therebetween. Details of the electrode pattern and its manufacture are found in U.S. application Ser. No. 08/989,928 (allowed), which is incorporated herein by reference. This information is also found in published PCT application No. WO99/30272.

U.S. Pat. Nos. 3,591,718 (Asane & Baxter), 4,198,539 (Pepper), and 4,797,514 (Talmadge & Gibson) disclose peripheral electrode patterns that include a continuous resistive electrode between corner connection points. The performance of such electrode patterns is sensitive to the stability and uniformity of the resistivity of the electrodes. Non-uniformity of the electrical properties of a continuous electrode along its length will distort the linearity of the sensor. Humidity and temperature variations in the application environment may have different effects on the electrical properties of continuous resistive electrodes, e.g. fabricated from a printed composite polymer ink, and the resistive coating in the touch area, e.g. ITO. If so, the linearity of the touchscreen may be compromised.

This sensitivity is in contrast to peripheral electrode patterns using discrete overlap resistors such as those found in Elo TouchSystems' AccuTouch™ products and disclosed in U.S. Pat. No. 5,045,644 to Dunthorn, which is incorporated herein by reference. Provided that good electrical contact is made between the electrode and the resistive coating, the resistance of discrete overlap resistors is dominated by the resistance of the resistive coating in the gap between the electrodes. The resistance of the electrodes printed with conductive inks is small in comparison, and hence there is little effect if the electrical properties of the conductive inks vary. Furthermore, as the gap resistance is formed of the same coating as used in the touch area, it will track variations of active region resistivity as a function of temperature and humidity. This provides the touchscreen with stable linearity even if the ohms/square of the resistive coating changes with environmental conditions.

Use of discrete overlap resistors leads to a discrete set of parallel connections between the peripheral electrode pattern and the touch sensitive region. This produces a ripple non-linearity in the touch area near the peripheral electrode pattern. An example of ripple can be seen in FIG. 4B of U.S. Pat. No. 5,045,644. Equipotential lines for both X and Y excitations are shown. Consider the set of equipotential lines used for X coordinate measurements. In the lower left corner, towards the center of the touch area and far from the peripheral electrode pattern, the X equipotential lines appear as uniformly spaced vertical lines. However, on the right side of this figure, distortion of the X equipotential lines is quite apparent. A finger moving down a vertical straight line (with a constant true X coordinate) in this region will experience variations in the X excitation voltage and hence variations in the measured X coordinate (unless otherwise corrected for). The cursor movement will be subject to perpendicular ripple distortion. There is a need to reduce this ripple while preserving the benefits of peripheral electrode designs that use overlap resistors.

Referring again to the right side of FIG. 4B of U.S. Pat. No. 5,045,644, note that the ripple tends to be approximately periodic with one repetition per overlap resistor electrode. Let S be a representative spacing of the overlap resistors and their electrodes along the series resistor chain. Then as a function of the vertical coordinate y, the potential in the ripple region for the X excitation will vary roughly sinusoidally with a wavelength of S, i.e., have approximate functional form $\cos(2\pi^*y/S)$. As is well known in electrostatics, the voltage excitation pattern in the touch area obeys the mathematics of Laplace's equation. To satisfy Laplace's equation, the X excitation potential within the ripple region at the right and left sides of the touch area will have approximately the following form.

$$A^* \exp(\pm 2\pi^* x/S)^* \cos(2\pi^* y/S)$$

The plus or minus in the exponent is minus if the X axis is directed away from the peripheral electrode border causing the ripple. Here A is a normalization constant. A similar expression applies to the Y excitation potential for the ripple near the top and bottom regions of the touch area.

Note that in the X direction, the above expression exponentially decays with a decay length of $S/2\pi$. Here we refer to the distance at which the ripple amplitude decays by a factor of e (2.71828 . . . ) as the "ripple decay length". A short ripple decay length is desirable to maximize the region of the touch area with little or no ripple. This in turn suggests reducing S by increasing the number of overlap resistors in the series resistor chains. As discussed below, however, the number of overlap resistors cannot be arbitrarily increased.

In the peripheral electrode patterns such as those disclosed in U.S. Pat. No. 5,045,644 and U.S. Ser. No. 08/989,928, one may attempt to reduce ripple by increasing the number of overlap resistors and hence increase the density of parallel connections to the touch area. However, if the number of overlap resistors in a series resistor chain is doubled, there is approximately half the perimeter length available with which to construct each overlap resistor. For a given gap distance, this roughly doubles the resistance of each overlap resistor. Combined with a doubling of the total number of overlap resistors, the total series resistance of the chain is quadrupled. As this total resistance increases, it rapidly becomes more difficult for the peripheral electrode pattern to maintain linear equipotential lines in the touch area. There remains a need to further reduce ripple, even after the number of overlap resistors in the resistor chain has been maximized.

Historically, most touch applications involve user activation of software programmed touch buttons or touch zones. A moderate amount of ripple non-linearity about the perimeter of the touch region typically had no noticeable effect. However touchscreens are now used in a variety of applications which make use of graphical user interfaces (GUI) that place small area buttons, scroll bars, and pull-down menus near the perimeter of the displayed image. If a finger is dragged in a vertical straight line along a narrow scroll bar, it is important that the reconstructed touch coordinates also follow a straight line. Perpendicular ripple distortion may cause problems for the operation of scroll bars and pull down menus. Parallel ripple distortion is less important here as it will not cause the cursor to leave the scroll bar or pull-down menu. Note that GUI interfaces will often place a narrow scroll bar close to perimeter of the touch zone.

U.S. Pat. No. 4,371,746 (Pepper) illustrates another approach to minimizing ripple non-linearity in peripheral electrode patterns incorporating discrete overlap resistors. FIG. 1b of U.S. Pat. No. 4,371,746 shows an electrode pattern with four successive rows of electrodes of increasing granularity. The granularity of the electrodes becomes finer closer to the touch area. The outer course grained electrodes provide the desired value of resistance between adjacent corner connection points while a succession of inner electrode rows of finer granularity can be continued until a desired reduction of ripple is achieved in the touch area. However, compared to patterns using a single series resistor chain between adjacent corner electrodes, a relatively wide peripheral electrode pattern is needed. Due to the need for narrow borders in touchscreen designs, there remains a need to reduce ripple in designs using a single series resistor chain between adjacent corner electrodes.

To achieve linear touchscreen system performance, it is not a requirement that the touchscreen itself be linear. Non-linear distortions can be corrected in either the electronics or by software in the host computer. For example, see U.S. Pat. No. 5,940,065 (Babb and Wilson). Smoothly varying deviations from linearity in the touchscreen are relatively easy to correct, while rapidly varying non-linearities such are ripple are much more problematic. Hence, even in touch systems with a non-linear touchscreen, there is a need to reduce ripple, thus leaving non-linearities that can more easily be corrected by downstream signal processing.

SUMMARY OF THE INVENTION

It is a principal object of this invention to reduce ripple non-linearity in a resistive or capacitive touchscreen having a substrate with four corner connection points. It is a related object to reduce the ripple non-linearity while maintaining a border electrode pattern which is relatively narrow so that the touch area is maximized.

These objects are achieved by providing a single series resistor chain of overlap resistor electrodes between each pair of corners, and by providing multiple parallel connections to each overlap resistor electrode as a means to reduce ripple non-linearity. In a preferred embodiment, this is accomplished by providing an insulating pattern proximate and interior to the resistor chain. The insulating pattern comprises a plurality of adjacent insulating regions in a linear array. The insulating regions are created by a lack of the resistive layer. Adjacent insulating regions are separated by gaps. The insulating pattern is positioned between the electrodes and the touch area. Such gaps may be referred to herein as deletion gaps. These gaps provide the current paths for the parallel connections between the touch area and the electrodes. Note that deletion gaps per se are known from U.S. Ser. No. 08/989,928, but that application only discloses a single deletion gap per overlap resistor electrode, resulting in a sinusoidal ripple potential based on an electrode spacing S as discussed above.

In the case of two parallel deletion gap connections per overlap resistor electrode, the ripple repeats with a distance S' equal to half the spacing of the overlap resistor electrodes. Hence the exponential decay length of the ripple is $S'/(2\pi)=S/(4\pi)$, thus greatly reducing the size of the ripple region. In addition to this effect, numerical simulations demonstrate an equally dramatic reduction in the amplitude A' in the expression $A'^* \exp(\pm 2\pi^* x/S')^* \cos(2\pi^* y/S')$. The net effect is to significantly reduce ripple distortion. Three or more parallel connections can further reduce ripple distortion.

The scope of this invention includes not only deletion gaps placed along the electrodes, but also deletion gaps placed between the junction between overlap resistor electrodes and the touch area. Simulations show that this design is equally effective in suppressing perpendicular ripple distortion. However, simulations indicate that designs with such junction deletion gaps tend to perform slightly less well in suppressing parallel ripple distortion.

In many touchscreen applications, there is limited space available for a touchscreen border region outside the touch area. This invention minimizes this border region in two ways.

First, by using only a single series resistor chain, the width of the electrode region can be kept small. For example, using "Z" shaped electrodes as in FIG. 8 of WO99/30272 provides a narrow series resistor chain. The parallel connections provided by gaps in a fine broken deletion line add little to the width of the peripheral electrode pattern. Second, the penetration of unacceptably large ripple non-linearity into the touch area is greatly reduced. The net effect is a greatly reduced border width with no added manufacturing cost.

As with the present AccuTouch™ product from Elo, the resistances of the parallel connections can be varied to provide a linear touchscreen. Shrinking the deletion gap increases the resistance while increasing the deletion gap dimension decreases the resistance of the parallel connection. Linear sensor designs can be iteratively obtained by building and testing designs, or by development of formulas of effective electrode resistance based on simulation of the component electrodes.

The invention provides improved geometry of conductive, resistive, and insulating regions of the peripheral electrode pattern. This improved geometry is not limited to any particular choice of materials or electronic read out methods.

BRIEF DESCRIPTION OF THE DRAWING

FIG. 1A is a schematic of a series resistor chain according to the prior art, having a single deletion gap per overlap resistor electrode;

FIG. 1B is a schematic of another series resistor chain according to the prior art, having a single deletion gap per overlap resistor electrode;

FIG. 1C is the equivalent circuit for the arrangements of FIGS. 1A and 1B;

FIG. 2A is a schematic of a series resistor chain according to the invention, having two deletion gaps per overlap resistor electrode;

FIG. 2B is the equivalent circuit for the arrangement of FIG. 2A;

FIG. 3A is a schematic of a series resistor chain according to the invention, having a deletion gap over each overlap resistor electrode and a deletion gap over each junction between electrodes;

FIG. 3B is the equivalent circuit for the arrangement of FIG. 3A;

DETAILED DESCRIPTION OF THE PREFERRED EMBODIMENTS

Figure 4:
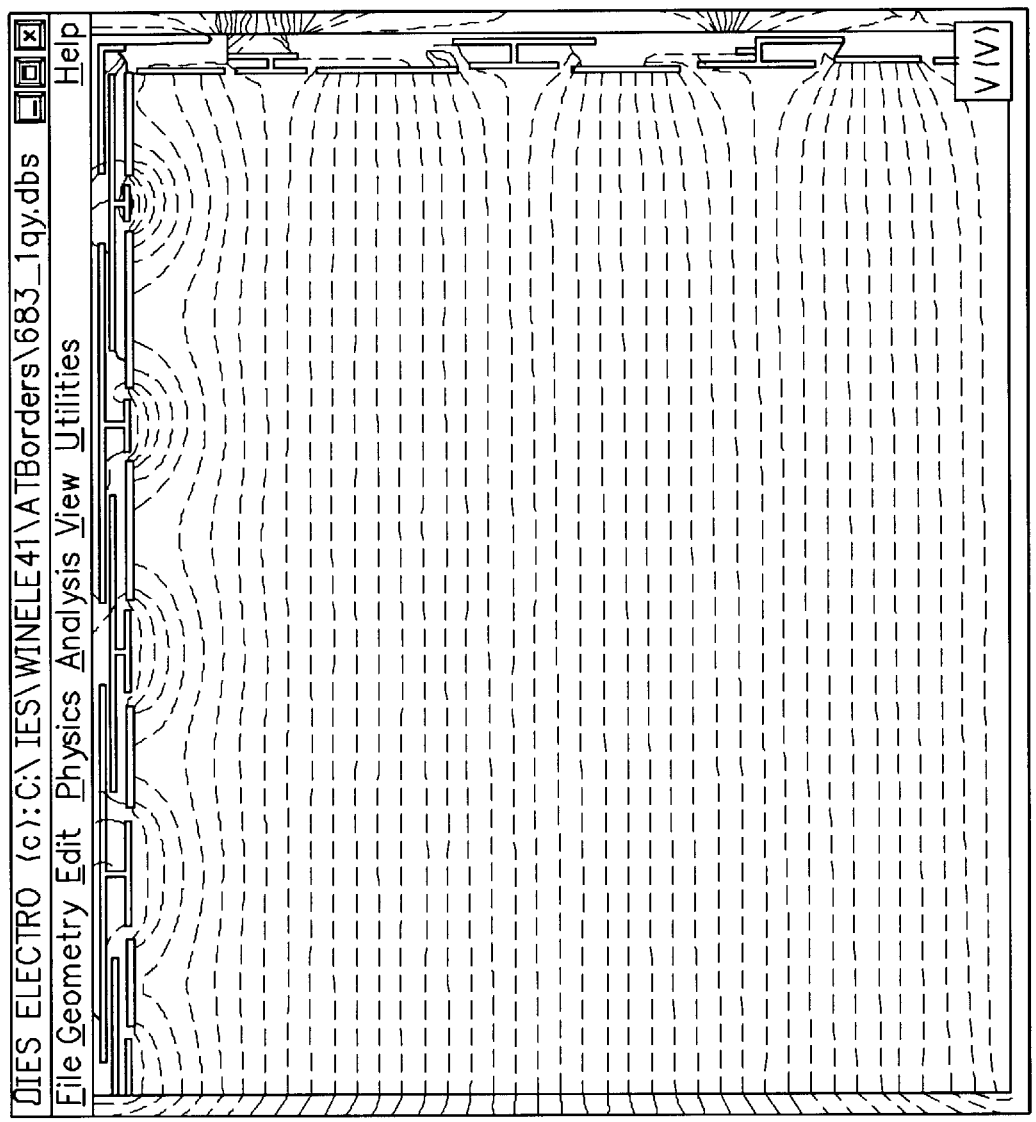
FIG. 4 shows the upper right quadrant of a prior art screen, with a simulation of equipotential lines for sensing a Y coordinate.

FIG. 1A shows the upper right portion of gradient sheet 10 which is formed by a glass substrate 12 having peripheral edges 13, corner 14 and a central touch area 15. The substrate is covered by a transparent resistive layer 16, for example ITO, having a substantially uniform resistivity. Positioned along each edge 13 is a series resistor chain 18 formed by a series of overlapping conductive strips 20; the resistive layer 16 between the overlapping portions provides a resistance so that the series resistor chain 18 has an incrementally stepped voltage along its length when a voltage is imposed at corner tabs 24. Each conductive strip 20 is connected to a T-shaped electrode 22. Lying between the electrodes 22 are insulating regions 26 where the resistive layer has been removed. Parallel resistive current paths are thus provided between electrodes on opposite sides of the touch area 15. Additional details of this prior art construction are discussed in U.S. application Ser. No. 08/989,928.

FIG. 1B shows the upper right portion of another prior art gradient sheet, which is discussed in conjunction with FIG. 8 in U.S. application Ser. No. 09/989,928. Here the resistor chain has Z-shaped electrodes 30, each having an outer portion 31 and an inner portion 32. The inner portion 32 of a first electrode 30 overlaps the outer portion 31 of a second, adjacent electrode 30. As a result, the resistive layer between these inner and outer portions forms a resistive connection. A plurality of insulating regions 34 are formed in the gradient sheet, for example by removing the resistive coating at selected places. Thereafter, areas of resistive coating remains between adjacent insulating regions 34, referred to herein as "gaps" 35. The insulating regions 34 and gaps 35 may also be formed by removing a line of the resistive coating (an insulation line) and thereafter placing resistive material, such as ITO on the sheet at selected places along the insulation line. This effectively provides the same final configuration as if only portions of the resistive coating were originally removed. In a preferred embodiment, the insulating regions and gaps are formed in a line parallel to the inner portions of the electrodes. As a result, a plurality of parallel current paths across the touch area are established. The insulating regions may be readily formed by laser ablation of the resistive coating. Insulating subsections extending between the electrodes may also be formed. Laser adjustment of these subsections effectively trims the resistors between the electrodes.

FIG. 1C is an equivalent circuit for the arrangement of either FIG. 1A or 1B, showing the parallel connections between the touch area and the nodes in the series resistor chain. These connections will also be referred to hereinafter as T-connections (for touch area connections). There is only one T-connection per inner portion 32 according to the prior art.

FIG. 2A shows a series resistor chain 38 according to the invention, having Z-electrodes 40 with overlapping outer and inner portions 41, 42, the inner portions 42 of adjacent electrodes being closest at junctions 44. A linear array of insulating regions 45 having gaps 46 (similar to those described above with respect to the prior art) runs parallel to the inner portions 42, but there are two gaps 46 for each portion of the series resistor chain 38 at which adjacent resistor electrodes 40 overlap. As shown in the equivalent circuit of FIG. 2B, this results in two parallel T-connections per inner portion 42. Likewise, if there are three gaps in the linear array of insulating regions adjacent to an inner portion 42, there will be three parallel T-connections extending into the touch area per inner portion 42.

As discussed in the Summary, the use of two gaps reduces the exponential decay length of the ripple by a factor of two. Likewise, the use of 3 gaps reduces the ripple decay length by a factor of three.

FIG. 3A shows a series resistor chain 48 according to the invention, having Z-electrodes 50 arranged as in FIG. 2A. However, here the linear array of insulating regions 55 not only has gaps 56 centered over the inner portions 52 of the electrodes, but also has gaps 57 centered over the junctions 54. As shown in FIG. 3B, this results in alternating T-connections being split between two adjacent electrodes, so that the effective voltage is halfway between the voltages of the adjacent electrodes 50.

FIGS. 4–7 are computer generated simulations which illustrate how the increase in the number of T-connections according to the invention, without increasing the number of stepped electrodes, reduces the ripple so that the touch area can extend right up to the insulating regions.

FIG. 4 shows equipotential lines in the upper right quadrant of a prior art touch screen having a series resistor chain along each peripheral edge. Each chain comprises seven T-shaped electrodes separated by insulating regions as illustrated in FIG. 1A. Linear voltage gradients are imposed on the series resistor chains along the left and right peripheral edges, while the top and bottom resistor chains are excited by common voltages at their left and right ends. The equipotential lines thus run horizontally while the current paths or T-connectors for measuring the Y coordinate of a touch run vertically. The considerable ripple adjacent to the top and bottom resistor chains limits the accuracy of measurements in this area; the size of the effective touch area is therefore reduced. In the next measuring interval the gradients will run across the top and bottom chains and the equipotential lines will appear vertically, while the current paths for measuring the X coordinate of a touch will run horizontally. However, a similar ripple will also appear adjacent to the left and right resistor chains.

Figure 5:
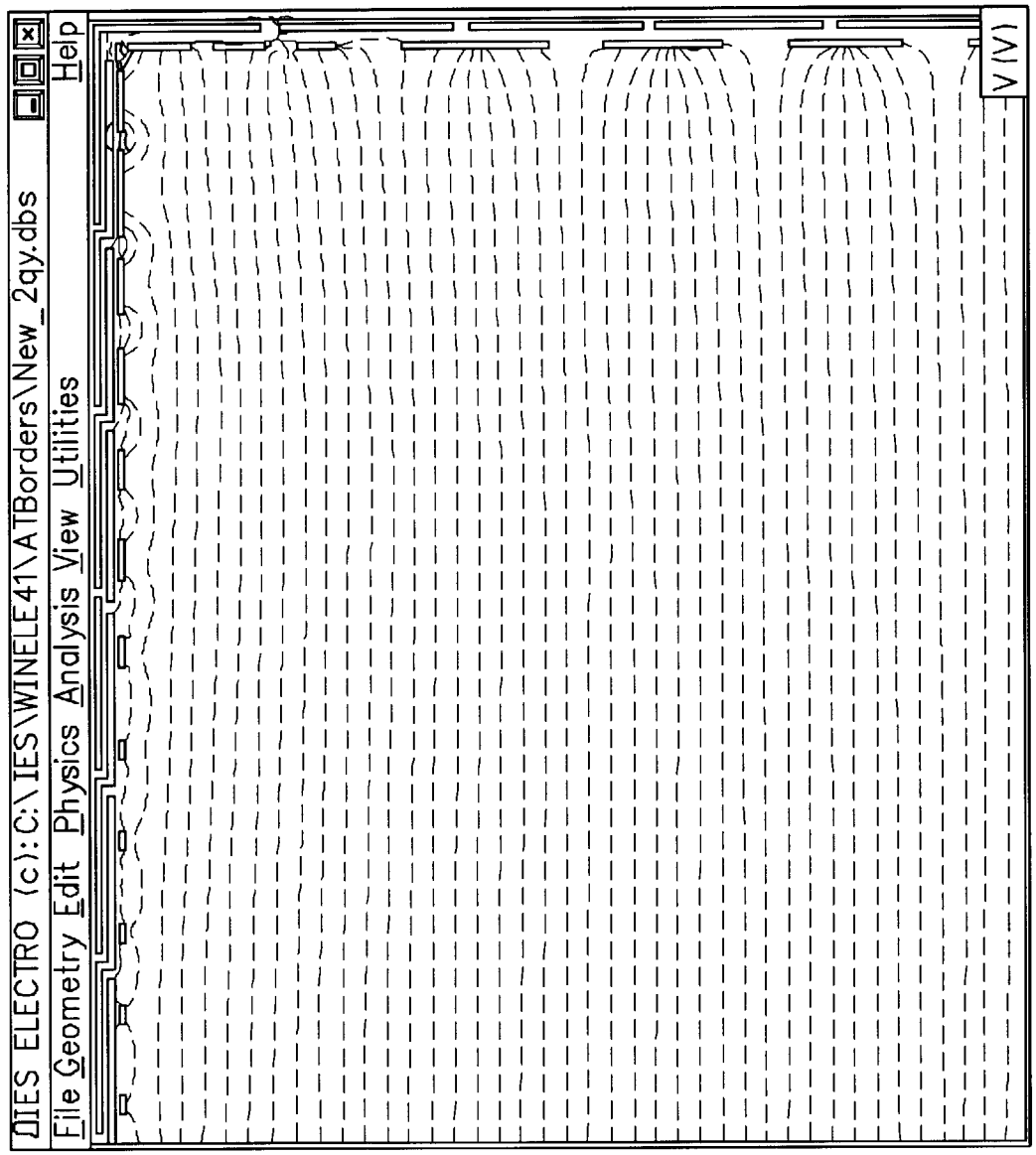
FIG. 5 shows the upper right quadrant of a screen according to the invention, having both non-junction and junction deletion gaps, with a simulation of equipotential lines for sensing a Y coordinate.

FIG. 5 shows equipotential lines in the upper right quadrant of a touchscreen according to the invention, having a series resistor chain with ten Z-shaped electrodes along each peripheral edge. Each chain is flanked by a linear array of insulating regions having an interruption or gap between each inner electrode portion and the touch sensitive area and between each junction and the touch sensitive area, as illustrated in FIG. 3A. The equipotential lines run horizontally for measuring the Y coordinate during this measuring interval, but here the ripple adjacent to the top and bottom chains has been substantially reduced, increasing the size of the useable touch area.

Figure 6:
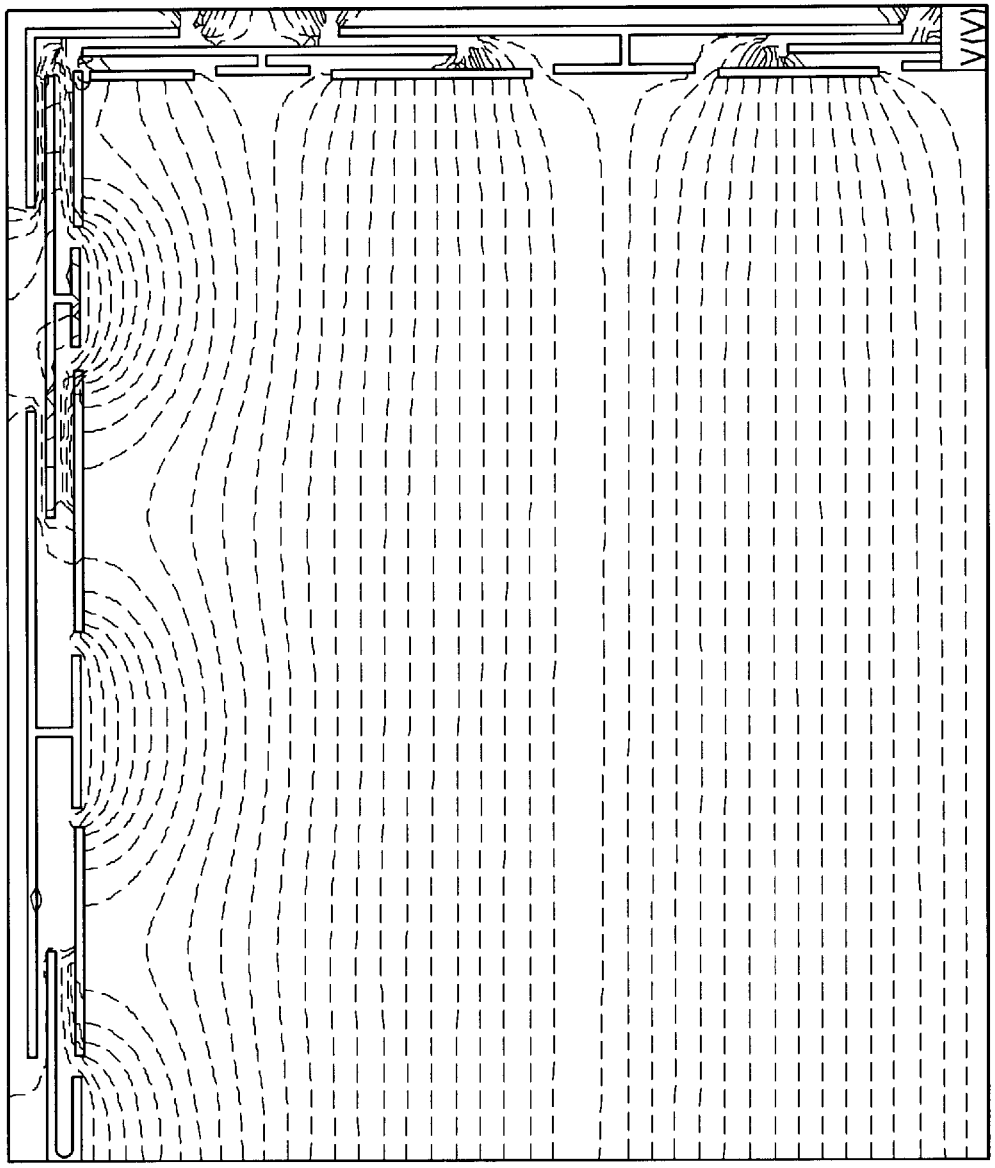
FIG. 6 shows the upper right quadrant of another prior art screen, with a simulation of equipotential lines for sensing a Y coordinate.

FIG. 6 shows the upper right quadrant of a prior art screen having a 6.2" diagonal and five T-shaped electrodes along each peripheral edge. Assuming a five volt corner excitation, the equipotential lines are spaced apart by approximately 0.05 volts. A roughly periodic ripple similar to that in FIG. 4 may be noted having a periodicity equal to the spacing of the T-shaped electrodes.

Figure 7:
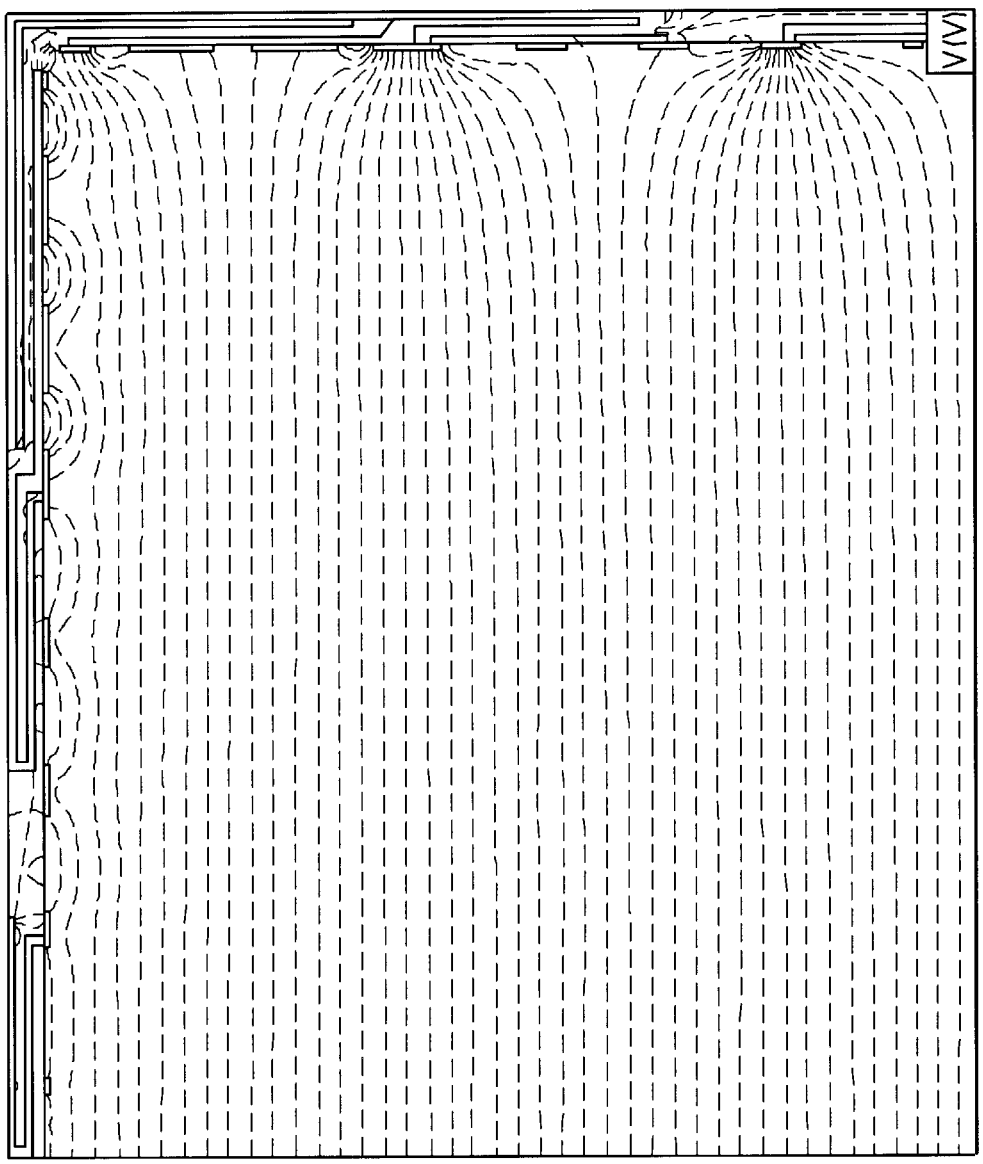
FIG. 7 shows the upper right quadrant of another screen according to the invention, having three non-junction deletion gaps per electrode, with a simulation of equipotential lines for sensing a Y coordinate.

FIG. 7 shows the upper right quadrant of a screen according to the invention, having a 6.2" diagonal and four Z-shaped electrodes as well as a central bar-shaped electrode along each peripheral edge. The Z-shaped electrodes are arranged in pairs symmetric to and overlapping the central bar electrode. Here, the line of insulating regions has three gaps over each inner electrode portion and the central bar, but there are no gaps over the junctions. Notwithstanding the limited number of electrodes and their large spacing, the ripple is substantially reduced because the decay length and thus the magnitude of the ripple is determined by the distance between the current paths or gaps. The size of the useable touch area is thereby maximized without increasing the number of electrodes, which would result in an unacceptably large resistance in the chains.

The foregoing is exemplary and not intended to limit the scope of the claims which follow.

What is claimed is:

1. A position touchscreen comprising
    a substrate having a resistive surface bounded by four peripheral edges which terminate at four corners, said resistive surface having a touch area interior to said edges,
    a series resistor chain proximate each of said peripheral edges for creating electric fields across said touch area, each resistor chain comprising a plurality of conductive electrodes arranged in series with resistive regions of said surface therebetween, each electrode having an inside portion facing said touch area, the inside portions of adjacent electrodes being separated by junctions, and
    a linear array of insulating regions in said resistive surface adjacent to each resistor chain between said resistor chain and said touch area, said linear array of insulating regions acting as electrical insulators, each said insulating regions being separated by gaps where said resistive surface is intact,
    wherein a plurality of gaps are positioned between a majority of each of said inside portions and said touch area thereby forming a plurality of conductive paths per said majority of inside portions across said touch area.

2. A position touchscreen as in claim 1 wherein none of said gaps are positioned between the junctions and the touch area.

3. A position touchscreen as in claim 1 wherein some of said gaps are positioned between the junctions and the touch area.

4. A position touchscreen as in claim 1 wherein each said insulating region runs parallel to said adjacent series resistor chain.

5. A position touchscreen as in claim 1 wherein said array of insulating regions is a line where said resistive surface has been removed, said line being parallel to said adjacent series resistor chain.

6. A position sensor as in claim 1 wherein at least some of said electrodes are Z-shaped electrodes, each Z-shaped electrode having an outside portion connected to said inside portion, at least some of said inside portions being parallel to respective said outside portions of adjacent electrodes.

7. A position sensor as in claim 6 wherein said electrodes further comprise a central bar electrode in each series chain, each said bar electrode being overlapped by outer portions of adjacent Z-shaped electrodes.

8. A position sensor as in claim 7 wherein said electrodes further comprise a right angle electrode at each corner, each said right angle connector overlapping an inner portion of one of said Z-shaped electrodes in each of two series chains, said right angle electrodes providing voltage inputs to each series chain.

* * * * *